US012795227B2

(12) United States Patent
Tanaka

(10) Patent No.: US 12,795,227 B2
(45) Date of Patent: Nov. 10, 2026

(54) OBJECT TRACKING APPARATUS, METHOD OF CONTROLLING THE SAME AND STORAGE MEDIUM

(71) Applicant: CANON KABUSHIKI KAISHA, Tokyo (JP)

(72) Inventor: Hiroyo Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/038,901

(22) Filed: Jan. 28, 2025

(65) Prior Publication Data

US 2025/0260888 A1 Aug. 14, 2025

(30) Foreign Application Priority Data

Feb. 14, 2024 (JP) ................................ 2024-020598

(51) Int. Cl.
*H04N 23/611* (2023.01)
*H04N 23/68* (2023.01)
*H04N 23/695* (2023.01)

(52) U.S. Cl.
CPC ......... *H04N 23/611* (2023.01); *H04N 23/687* (2023.01); *H04N 23/695* (2023.01)

(58) Field of Classification Search
CPC .. H04N 23/611; H04N 23/687; H04N 23/695; H04N 23/6811; H04N 23/6812
USPC ........................................................ 348/169
See application file for complete search history.

(56) References Cited

U.S. PATENT DOCUMENTS 10,594,939 B2 3/2020 Wakamatsu
2014/0185875 A1* 7/2014 Tsuji .................... H04N 23/611 382/103
2015/0003684 A1* 1/2015 Appia ..................... G06T 7/136 382/106
2016/0316123 A1* 10/2016 Wakamatsu ............ G06T 7/246
2019/0158745 A1* 5/2019 Idaka ................. H04N 23/6815
2021/0256711 A1* 8/2021 Yachida ................. H04N 23/61
2023/0274522 A1* 8/2023 Yonezawa ............... G06T 7/246 382/103
2024/0169734 A1* 5/2024 Marlow ................. H04N 7/181
2025/0260888 A1* 8/2025 Tanaka ................. H04N 23/611

FOREIGN PATENT DOCUMENTS

JP 2016-208252 A 12/2016

* cited by examiner

*Primary Examiner* — Loi H Tran
(74) *Attorney, Agent, or Firm* — Venable LLP

(57) ABSTRACT

An object tracking apparatus includes an object detection unit configured to be capable of detecting an object in a captured image by using a plurality of detection methods; a tracking unit configured to change an imaging range based on a target position within a captured image, and track the object; and a control unit configured to control a degree of tracking at which the tracking unit tracks the object, in accordance with a detection method whose detection result is used by the tracking unit and by which the object detection unit detects the object.

15 Claims, 9 Drawing Sheets

| OBJECT DETECTION METHOD | NOISE AMOUNT | CUT-OFF FREQUENCY | DEGREE OF TRACKING |
|---|---|---|---|
| OBJECT DETECTION METHOD 1 | LOW | Fc1 | HIGH |
| OBJECT DETECTION METHOD 2 | MEDIUM | Fc2 | MEDIUM |
| OBJECT DETECTION METHOD 3 | HIGH | Fc3 | LOW |

OBJECT TRACKING APPARATUS, METHOD OF CONTROLLING THE SAME AND STORAGE MEDIUM

BACKGROUND OF THE INVENTION

Field of the Invention

The present invention relates to a technique for tracking an object in an imaging apparatus.

Description of the Related Art

In recent years, many imaging apparatuses having an image blur correction function have been developed, and in such an imaging apparatus, it is possible to stabilize an image blur of a moving image. In the image blur correction function, there are (1) optical image blur correction and (2) electronic image blur correction. The former is a technique for correcting an image blur by driving a part of an optical system or an imaging element so as to cancel out a camera shake in response to a camera shake signal detected by a sensor that detects a camera shake. The latter is a technique for correcting an image blur by shifting a region from which an image is cut out by image processing in response to a camera shake signal.

Meanwhile, when a moving image is recorded by an imaging apparatus having the above image blur correction function, an object may go out of frame even if an image blur caused by a camera shake is corrected. This is because if an object is a moving object with large movements, even if an image blur caused by a camera shake is corrected, the movements of the object cannot be tracked. Therefore, in order to prevent a moving object from going out of frame, a photographer must always focus on panning and tilting, which change the direction of imaging, in accordance with the movements of the object.

With respect to the above problems, an object tracking function for maintaining tracking of an object by using, for example, electronic image blur correction and a mechanism usually used for image blur correction, is known. The object tracking function is realized by moving the imaging range by the above image blur correction mechanism and the like such that an object continues to be positioned around a predetermined position in the screen. This technique allows photographers to stabilize and capture an object image without maintaining focus on panning and tilting for object tracking.

In general, in order to stably control the imaging range such that an object continues to be positioned around a predetermined position in the screen, stable detection of an object position and a mechanism for stably shifting the imaging range are necessary. However, depending on the imaging condition, a moving unit for changing the imaging range would oscillate.

With respect to this problem, Japanese Patent Laid-Open No. 2016-208252 proposes providing a control apparatus for tracking an object by using a movable means for shifting and moving the object with a detection means for detecting an imaging condition of a captured image, and changing a degree of tracking of the object in accordance with the detected imaging condition.

In Japanese Patent Laid-Open No. 2016-208252, the imaging condition is exemplified by a focal length, an imaging magnification, a distance to the object, an electronic zoom magnification, a frame rate, a shake amount, and a degree of reliability representing a reliability of the object. Specifically, control methods such as the following are described. Control is performed such that the greater the focal length, the imaging magnification, and the electronic zoom magnification, the smaller the degree of tracking. Control is performed such that the smaller the degree of tracking, the smaller the distance to the object. Control is performed such that the smaller the frame rate, the smaller the degree of tracking. Control is performed such that the smaller the degree of reliability of the object, the smaller the degree of tracking. With such a configuration, it is possible to provide a good object tracking apparatus that is responsive to the imaging condition while reducing the oscillation of the movable means for shifting and moving an object.

However, in Japanese Patent Laid-Open No. 2016-208252, the accuracy of object position detection in object detection is not considered.

In an object detection function provided in recent tracking apparatuses, it is possible to detect an object by using a plurality of techniques. A method for detecting a human, an animal, and a face region by image recognition, a method for detecting an organ (part) such as a pupil, a nose, or a mouth on a face by image recognition, a method for detecting the entire body of an object (entire object) by image recognition, and the like are known as examples of an object detection method. In addition, a detection method for identifying an object from a degree of match between a temporarily stored template image and a histogram, color data, and the like, without using image recognition is also known. It is known that the accuracy of object position detection changes depending on the detection method.

When object tracking is performed, if tracking control is performed to the same degree as when the accuracy of object position detection is high while the accuracy of object position detection is low, that is, a large noise component is included, a moving image may subtly shake due to the noise component, which is not preferable in an image.

In addition, when the object detection method is changed during object tracking, a detected object position may change due to a difference in the object detection method. As a result, a moving image may shake for a moment at a timing when the object detection method is changed, and the quality of the moving image may deteriorate.

SUMMARY OF THE INVENTION

The present invention has been made in view of the above problems and provides an object tracking apparatus capable of reducing subtle shakes of an image attributable to accuracy of object position detection when performing object tracking.

According to a first aspect of the present invention, there is provided an object tracking apparatus comprising: at least one processor or circuit and a memory storing instructions to cause the at least one processor or circuit to perform operations of the following units: an object detection unit configured to be capable of detecting an object in a captured image by using a plurality of detection methods; a tracking unit configured to change an imaging range based on a target position within a captured image, and track the object; and a control unit configured to control a degree of tracking at which the tracking unit tracks the object, in accordance with a detection method whose detection result is used by the tracking unit and by which the object detection unit detects the object.

According to a second aspect of the present invention, there is provided an object tracking method comprising: executing object detection allowing detection of an object in a captured image by using a plurality of detection methods; changing an imaging range based on a target position within a captured image, and tracking the object; and controlling a degree of tracking at which the object is tracked, in accordance with a detection method whose detection result is used in the tracking and by which the object is detected.

Further features of the present invention will become apparent from the following description of exemplary embodiments with reference to the attached drawings.

DESCRIPTION OF THE EMBODIMENTS

Figure 1:
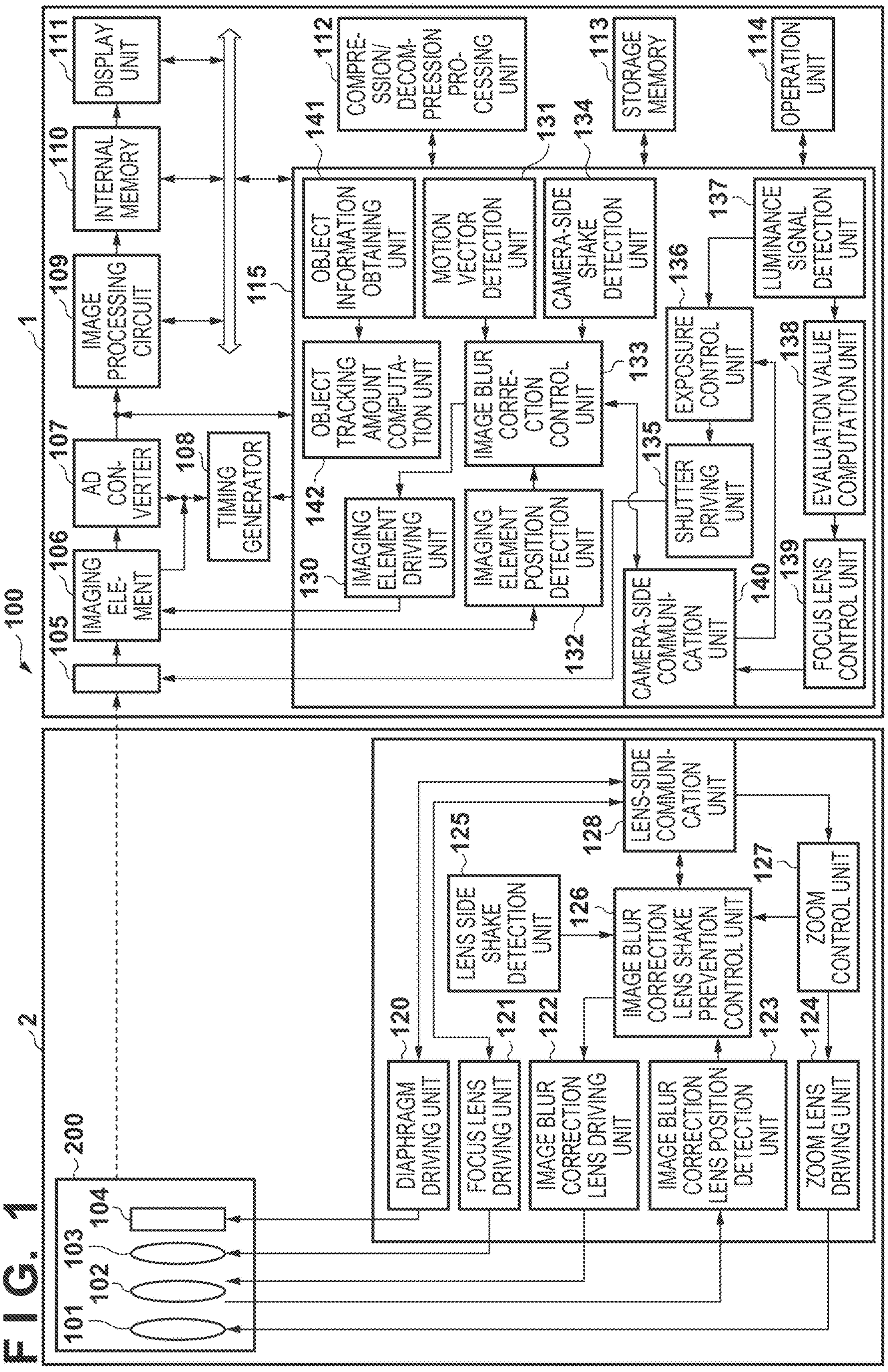
FIG. 1 is a block diagram illustrating an example of a configuration of an imaging apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

In the present embodiment, a method of reducing subtle shakes of a moving image caused by a noise component of an object position by changing a degree of tracking depending on the object detection method will be described.

FIG. 1 is a block diagram illustrating a configuration of an imaging apparatus 100, which is a first embodiment of an object tracking apparatus according to the present invention.

In FIG. 1, the imaging apparatus 100 is configured to include a camera body 1 and an imaging lens 2. A zoom lens 101 moves in an optical axis direction and thereby optically changes a focal length of an imaging optical system 200, which forms an object image, and changes the angle of view. An image blur correction lens 102 moves in a direction perpendicular to the optical axis, and thereby optically corrects an image blur caused by a shake of the imaging apparatus 100. A focus lens 103 moves in the optical axis direction, and thereby optically adjusts a focus position. A diaphragm 104 and a shutter 105 can adjust the amount of light by opening and closing, and are used for exposure control.

The light that has passed through the imaging optical system 200 is received by an imaging element 106 in which a charge-coupled device (CCD), a complementary metal-oxide semiconductor (CMOS) sensor, or the like is used, and is converted from a light signal into an electric signal.

An AD converter 107 performs noise removal processing, gain adjustment processing, and AD conversion processing on an imaging signal read from the imaging element 106.

A timing generator 108 controls a drive timing of the imaging element 106 and an output timing of the AD converter 107 in accordance with commands of a camera control unit 115.

An image processing circuit 109 performs pixel interpolation processing, color conversion processing, and the like on output from the AD converter 107, and then transmits processed image data to an internal memory 110. The image processing circuit 109 includes a circuit for positioning a plurality of consecutively captured images, a geometric transformation circuit for performing cylindrical coordinate transformation and lens distortion correction, a compositing circuit for performing trimming and composite processing, and the like.

A display unit 111 displays imaging information and the like together with image data held in the internal memory 110.

A compression/decompression processing unit 112 performs compression processing or decompression processing on data stored in the internal memory 110 according to an image format. A storage memory 113 stores various kinds of data such as parameters.

An operation unit 114 is a user interface for a user to perform various menu operations and mode switching operations.

The camera control unit 115 is constituted by a computational unit such as a central processing unit (CPU) and executes various control programs stored in the internal memory 110 in response to an operation of the user by the operation unit 114. The control programs are, for example, programs for performing zoom control, image blur correction control, automatic exposure control, automatic focus adjustment control, processing for tracking an object, and the like. Each block illustrated in the camera control unit 115 is realized by the camera control unit 115 executing a control program stored in the internal memory 110. However, these blocks may be configured as circuits independent of the camera control unit 115.

In the case of an interchangeable lens camera, information transmission between the camera body 1 and the imaging lens 2 is performed by a camera-side communication unit 140 and a lens-side communication unit 128.

A diaphragm driving unit 120 drives the diaphragm 104, and a shutter driving unit 135 drives the shutter 105.

A luminance signal detection unit 137 detects, as an object and a luminance of a scene, a signal that has been read from the imaging element 106 and passed through the AD converter 107. An exposure control unit 136 calculates an exposure value (aperture value and shutter speed) based on luminance information obtained by the luminance signal detection unit 137 and notifies the diaphragm driving unit 120 and the shutter driving unit 135 of that calculation result. The exposure control unit 136 simultaneously performs control for amplifying an imaging signal read from the imaging element 106. Automatic exposure control (AE control) is thereby performed.

A zoom lens driving unit 124 drives the zoom lens 101 and thereby changes the angle of view. A zoom lens control unit 127 controls the position of the zoom lens 101 in accordance with a zoom operation instruction by the operation unit 114.

A focus lens driving unit 121 drives the focus lens 103. An evaluation value computation unit 138 extracts a particular frequency component from the luminance information obtained by the luminance signal detection unit 137, and then calculates a contrast evaluation value based on that. A focus lens control unit 139 performs a command for driving the focus lens 103 by predetermined driving amounts over a predetermined range, and simultaneously obtains evaluation values, which are a result of computation of the evaluation value computation unit 138 at respective focus lens positions. A defocus amount in a contrast AF method is calculated from a focus lens position where a change curve of the contrast evaluation values is at its peak, and is transmitted to the focus lens driving unit 121. The focus lens driving unit 121 drives the focus lens 103 in accordance with the defocus amount, and thereby performs autofocus control (AF control) for focusing a beam of light on the surface of the imaging element 106.

Here, the contrast AF method has been described, but the method may be a phase difference AF method. The details of the phase difference AF method are known, and thus, description thereof will be omitted.

A shake detection unit (134, 125) detects shakes and oscillations applied to the imaging apparatus. In the present embodiment, a lens-side shake detection unit 125 for detecting vibrations of shakes and oscillations applied to the lens is arranged on the lens side separately from a camera-side shake detection unit 134 arranged on the camera side.

An image blur correction lens position detection unit 123 detects the position of the image blur correction lens 102. An image blur correction lens shake prevention control unit 126 calculates an image blur correction amount for reducing shakes with respect to a shake detection signal detected by one or both of the lens-side shake detection unit 125 and the camera-side shake detection unit 134 and notifies an image blur correction lens driving unit 122. The image blur correction lens driving unit 122 controls driving of the image blur correction lens 102 in a direction perpendicular to the optical axis.

A camera-side image blur correction control unit 133 can communicate with the image blur correction lens shake prevention control unit 126 through the camera-side communication unit 140 and the lens-side communication unit 128 in the imaging lens 2. The camera-side image blur correction control unit 133 calculates an imaging element shake correction amount for reducing shakes using the imaging element 106 based on a shake detection signal detected by one or both of the camera-side shake detection unit 134 and the lens-side shake detection unit 125, and then, transmits a signal for driving the imaging element 106 to an imaging element driving unit 130 based on the calculated correction amount and the position of the imaging element 106 detected by an imaging element position detection unit 132, and thereby controls shake prevention by the imaging element 106. The imaging element driving unit 130 drives the imaging element 106 in a direction perpendicular to the optical axis based on an imaging element driving signal received from the image blur correction control unit 133.

A motion vector detection unit 131 calculates a value of correlation between a current frame and a previous frame in block units, into which the frames have been divided, according to a block matching method, and then, searches for a block of the previous frame with a minimum calculation result, and detects, as motion vectors, shifts of other blocks based on that block.

An object information obtaining unit 141 is a block that obtains information necessary for tracking amount computation from the image processing circuit 109. An object tracking amount computation unit 142 is a block that computes an object tracking amount. The object tracking amount computation unit 142 may be configured to obtain information directly from the image processing circuit 109 without going through the object information obtaining unit 141. The object information obtaining unit 141 and the object tracking amount computation unit 142 will be described later with reference to FIG. 2.

Figure 2:
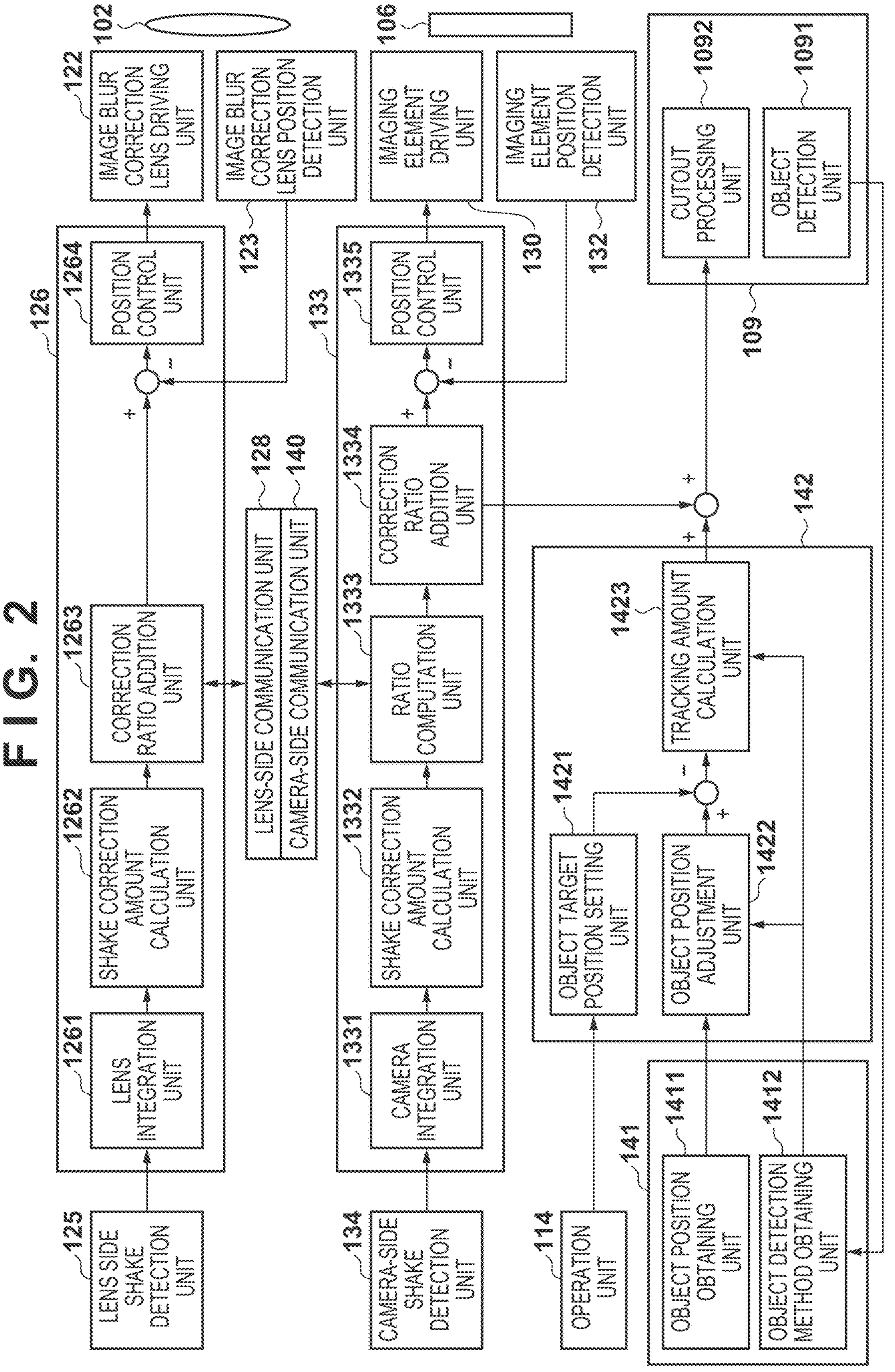
FIG. 2 is a diagram illustrating a block configuration of parts related to image blur correction control and object tracking control.

FIG. 2 is a diagram illustrating a block configuration of parts related to image blur correction control and object tracking control according to the first embodiment.

First, the camera-side image blur correction control unit 133 will be described.

A shake angular velocity detected by the camera-side shake detection unit 134 is converted into a shake angle by a camera integration unit 1331 performing integration processing. Here, it is assumed that the camera integration unit 1331 uses an integration low-pass filter (hereinafter, referred to as integration LPF).

A shake correction amount calculation unit 1332 calculates a correction amount that cancels a shake angle, taking a frequency band of the shake angle and a drivable range of the imaging element 106 into consideration, and specifically, calculates a shake correction amount by integrating a gain related to a distance to an object and a zoom magnification into the shake angle.

A ratio computation unit 1333 computes a ratio of correction to be handled on the camera side for when a total of the shake correction amounts on the camera side and the lens side is 100%. In the present embodiment, the correction ratio is determined based on a movable range of each of the imaging element 106 and the image blur correction lens 102, and may be determined taking a movable range proportional to correction (electronic image blur correction) by cutout in image processing into consideration in addition to movable ranges of shake correction members. A correction ratio addition unit 1334 multiplies the shake correction amount by a result of computation of the ratio computation unit 1333 and calculates a correction amount that is based on the correction ratio.

A position control unit 1335 performs PID control (proportional control, integral control, and derivative control) on an error between a target position and a present position in a correction amount for the imaging element 106 and converts the error into an imaging element driving signal and inputs the imaging element driving signal to the imaging element driving unit 130. The current position is a result of output of the imaging element position detection unit 132. PID control is a common technique, and thus, detailed explanation will be omitted. The imaging element driving unit 130 drives the imaging element 106 according to an image blur correction driving signal.

Next, the lens-side image blur correction lens shake prevention control unit 126 will be described.

A shake angular velocity detected by the lens-side shake detection unit 125 is converted into a shake angle by a lens integration unit 1261 performing integration processing.

Here, an integration LPF is used for the lens integration unit 1261. A shake correction amount calculation unit 1262 calculates a correction amount that cancels a shake angle, taking a frequency band of the shake angle and a drivable range of the image blur correction lens 102 into consideration, and specifically, calculates a shake correction amount by integrating a gain related to a distance to an object and a zoom magnification into the shake angle.

A correction ratio integration unit 1263 multiplies a correction amount by a ratio of correction to be handled on the lens side for when a total of the shake correction amounts on the camera side and the lens side is 100%, and thereby obtains a correction amount that is based on the correction ratio. In the present embodiment, it is assumed that the ratio of correction to be handled by the lens side is determined from a result of calculation of the camera-side ratio computation unit 1333. The ratio of correction to be handled on the camera side or the lens side is notified through the camera-side communication unit 140 and the lens-side communication unit 128.

A position control unit 1264 performs PID control (proportional control, integral control, and derivative control) on an error between a target position and a present position in a correction amount for the image blur correction lens 102 and converts the error into a signal for driving the image blur correction lens 102 and inputs the driving signal to the image blur correction lens driving unit 122. The current position is a result of output of the image blur correction lens position detection unit 123. PID control is a common technique, and thus, detailed explanation will be omitted. The image blur correction lens driving unit 122 drives the image blur correction lens 102 according to an image blur correction driving signal.

The image blur correction lens 102 and the imaging element 106 are thus driven, and an image blur due to a camera shake can thereby be reduced.

Next, the image processing circuit 109 will be further described with reference to FIG. 2.

In the present embodiment, the image processing circuit 109 includes an object detection unit 1091. The object detection unit 1091 is a block that detects an image region of an object included in a captured image based on an image signal outputted from the imaging element 106 and generates object detection information. The object detection unit 1091 can detect an object in a captured image by using a plurality of types of detection methods.

More specifically, the object detection unit 1091 includes a face detection function for detecting a person, an animal, or a face by image recognition, a function for detecting an organ (part) such as a pupil, a nose, or a mouth on a face by image recognition, a whole body detection function for detecting the entire body of an object (entire object) by image recognition, and the like, and then, calculates the positions of a face, organs, and the entire body from results of face detection, organ detection, and whole body detection.

Regarding face detection and whole body detection by the object detection unit 1091, the shapes of contour portions of a face and the entire body are stored as feature data, and an image region that matches feature data is identified by pattern matching processing for each image in which detection is to be performed.

In face detection, processing for identifying an image region that matches feature data representing a shape of a face internally stored in advance is performed by pattern matching processing on a region obtained by whole body detection. In addition, a degree of match with internally stored feature data is calculated, and a region having a degree of match greater than or equal to what is predetermined is assumed as a face or whole body region.

Further, in order to increase occasions of face and whole body detection and increase detection accuracy, pattern matching processing is performed using a plurality of pieces of feature data stored in the image processing circuit 109. The pattern matching processing may be performed using feature data of only a portion of face and whole body shapes. Further, in order to detect a face and a whole body regardless of their sizes, the pattern matching processing may be performed by changing the size of feature data.

In organ detection, processing for identifying an image region that matches feature data representing a shape of an organ internally stored in advance is performed by pattern matching processing on a region obtained by face detection.

As another detection method, detection by deep learning can also be performed. The object detection unit 1091 includes a plurality of product-sum operators and is also used as a block that performs processing for performing deep learning. The object detection unit 1091 applies object detection processing to image data using one learning model selected by the camera control unit 115 from among a plurality of stored learning models. The object detection unit 1091 may perform a plurality of types of detection processing on one piece of image data by switching the learning model.

The object detection unit 1091 also performs processing for identifying an object among captured images such as live-view images. When detecting an object, the object detection unit 1091 temporarily stores an image of a region of the detected object in the internal memory 110 as a template. The object detection unit 1091 searches for (performs template matching on) a region that matches the template temporarily stored in the internal memory 110 from among images generated during live view, based on template information temporarily stored in the internal memory 110, and sets a matched region as an object region.

As a method for the object detection unit 1091 to search for a region that matches the template temporarily stored in the internal memory 110, there is a method in which an image is cut out for each region, an absolute value of a difference from the template temporarily stored in the internal memory 110 is obtained, and a region with a small difference is assumed as an object region. There are other methods such as that in which a region is obtained based on a degree of match in histogram, color data, and the like with the template temporarily stored in the internal memory 110, but other methods may be assumed so long as a region that matches the template temporarily stored in the internal memory 110 can be identified in an image.

As described above, in the present embodiment, the object detection unit 1091 also functions as a means for identifying a region by comparing images over a plurality of images sequentially obtained by the imaging element 106, based on a particular object detected from an image or at least one part thereof.

In the above, it has been described that the object detection unit 1091 can detect an object by using a plurality of object detection methods. However, a switch can be made to another object detection method when an object cannot be detected using a particular object detection method. For example, when an object cannot be detected by image recognition, an object region can be identified by object identification processing.

Next, the image processing circuit 109 includes a cutout processing unit 1092, which performs electronic image blur correction.

Here, a method of projective transformation for electronic image blur correction performed by the cutout processing unit 1092 will be described. Here, when the coordinates of each pixel in an image before correction are (X0, Y0) and the coordinates of each pixel in an image after correction are (X1, Y1), (Equation 1) below is assumed.

$$\begin{bmatrix} X1 \\ Y1 \\ 1 \end{bmatrix} = \begin{bmatrix} h1 & h2 & h3 \\ h4 & h5 & h6 \\ h7 & h8 & 1 \end{bmatrix} \begin{bmatrix} X0 \\ Y0 \\ 1 \end{bmatrix} \quad \text{(Equation 1)}$$

Here, a 3×3 matrix in (Equation 1) is commonly referred to as a projective transformation matrix. The values of respective elements in this matrix indicate the following amounts. h1, h2, h4, and h5 indicate rotational component shake correction amounts, h3 and h6 indicate translational component shake correction amounts, and h7 and h8 indicate perspective component shake correction amounts. When (Equation 1) is transformed, (Equation 2) and (Equation 3) are obtained, and coordinates (X1, Y1) of each pixel in the corrected image can be calculated.

$$X1 = (h2 \cdot X0 + h1 \cdot Y0 + h3)/(h7 \cdot X0 + h8 \cdot Y0 + 1) \quad \text{(Equation 2)}$$

$$Y1 = (h4 \cdot X0 + h5 \cdot Y0 + h6)/(h7 \cdot X0 + h8 \cdot Y0 + 1) \quad \text{(Equation 3)}$$

When a pitch angular shake amount is θp, a yaw angular shake amount is θy, a roll angular shake amount is θr, a horizontal translation correction amount is tx, a vertical translation correction amount is ty, a horizontal perspective correction amount is vx, a vertical perspective correction amount is vy, and a focal length is f, the respective elements h1 to h8 of the 3×3 matrix of (Equation 1) can be expressed as in (Equation 4) to (Equation 11).

$$h1 = \cos\theta r \quad \text{(Equation 4)}$$

$$h2 = -\sin\theta r \quad \text{(Equation 5)}$$

$$h3 = tx = f \cdot \tan\theta y \quad \text{(Equation 6)}$$

$$h4 = \sin\theta r \quad \text{(Equation 7)}$$

$$h5 = \cos\theta r \quad \text{(Equation 8)}$$

$$h6 = ty = f \cdot \tan\theta p \quad \text{(Equation 9)}$$

$$h7 = vx = -(\tan\theta y)/f \quad \text{(Equation 10)}$$

$$h8 = vy = -(\tan\theta p)/f \quad \text{(Equation 11)}$$

In order to correct a shake caused by the pitch angular shake θp, the vertical translational component shake correction amount ty and the vertical perspective component shake correction amount vy are calculated from (Equation 9) and (Equation 11). In order to correct a shake caused by the yaw angular shake θy, the horizontal translational component shake correction amount tx and the horizontal tilt component shake correction amount vx are calculated from (Equation 6) and (Equation 10). In order to correct a shake caused by the roll angular shake θr, the rotational shake correction amounts are calculated from (Equation 4), (Equation 5), (Equation 7), and (Equation 8).

The cutout processing unit 1092 sets the respective components h1 to h8 and performs projective transformation. Each shake component can thus be corrected, and therefore, electronic image blur correction can be performed.

Next, a control block for tracking an object will be described.

In FIG. 2, the object information obtaining unit 141 is a block that extracts and obtains information of an object detected by the object detection unit 1091, and obtains necessary information such as an object type (person, animal, or vehicle), a part (pupil, face, or body), a position, and a size. In the present embodiment, it is assumed that information related to a method used for object detection can also be obtained.

A photographer can set an arbitrary object as a tracking target object through the operation unit 114 by performing a touch operation or a button operation. A configuration may be taken such that even if there is no member operation by the photographer, a tracking target object is determined by an automatic object setting program of the camera. The object information obtaining unit 141 can assume an object selected by the photographer or the camera as a main object and obtain detection information related to the main object. In the present embodiment, it is assumed that an object position can be obtained by an object position obtaining unit 1411 and an object detection method can be obtained by an object detection method obtaining unit 1412.

The object tracking amount computation unit 142 performs processing for changing an imaging range such that an object is stabilized at a predetermined position based on the object detection information obtained from the object information obtaining unit 141. The processing for changing an imaging range can be performed by changing an image cutout position as in the case of electronic image blur correction or by moving the housing itself. More specifically, the processing for changing an imaging range is performed by a means for shifting an imaging range, and a mechanism for moving an optical member such as a lens or an imaging element, a mechanism for panning and tilting the imaging apparatus, a gimbal mechanism, a method of changing an image cutout position as in electronic image blur correction, and the like can be used. In the present embodiment, description will be given assuming that an image cutout position is changed in the cutout processing unit 1092.

An object target position setting unit 1421 performs processing for setting an arbitrary position within the angle of view as an object target position. The photographer can set the object target position through the operation unit 114. For example, the coordinates at the center of the angle of view are set or an object target position arbitrarily set by the photographer is set. In the present embodiment, in order to simplify the description, the object target position is the center of the angle of view.

An object position adjustment unit 1422 performs processing for adjusting an object position as necessary based on an object position and an object detection method from the object information obtaining unit 141. In the present embodiment, object detection information is obtained through the object information obtaining unit 141, but a configuration may be taken so as to directly obtain information from the object detection unit 1091 in the image processing circuit 109.

A tracking amount calculation unit 1423 calculates an object tracking amount according to the object target position set by the object target position setting unit 1421 and the object position adjusted by the object position adjustment unit 1422. As described above, the object target position is the center of the angle of view, and therefore, a difference between output of the object position adjustment unit 1422 and a position of the center of the angle of view is calculated.

It is assumed that the tracking amount calculation unit 1423 includes a function for further performing filter processing and reducing noise related to the object position. In the present embodiment, it is assumed that a degree of object tracking can be changed by changing a cut-off frequency of the filter according to the object detection method. This processing will be described in detail later.

The cutout processing unit 1092 of the image processing circuit 109 performs projective transformation processing with the filtered object tracking amount as input and can thereby perform object tracking. If it is desired to perform shake component correction and object tracking in the cutout processing unit 1092, they can both be achieved by the object tracking amount being added to the above translational component shake correction amounts tx and ty. In addition, regarding the perspective correction amounts vx and vy, the object tracking amount is considered as necessary.

Figure 3A:
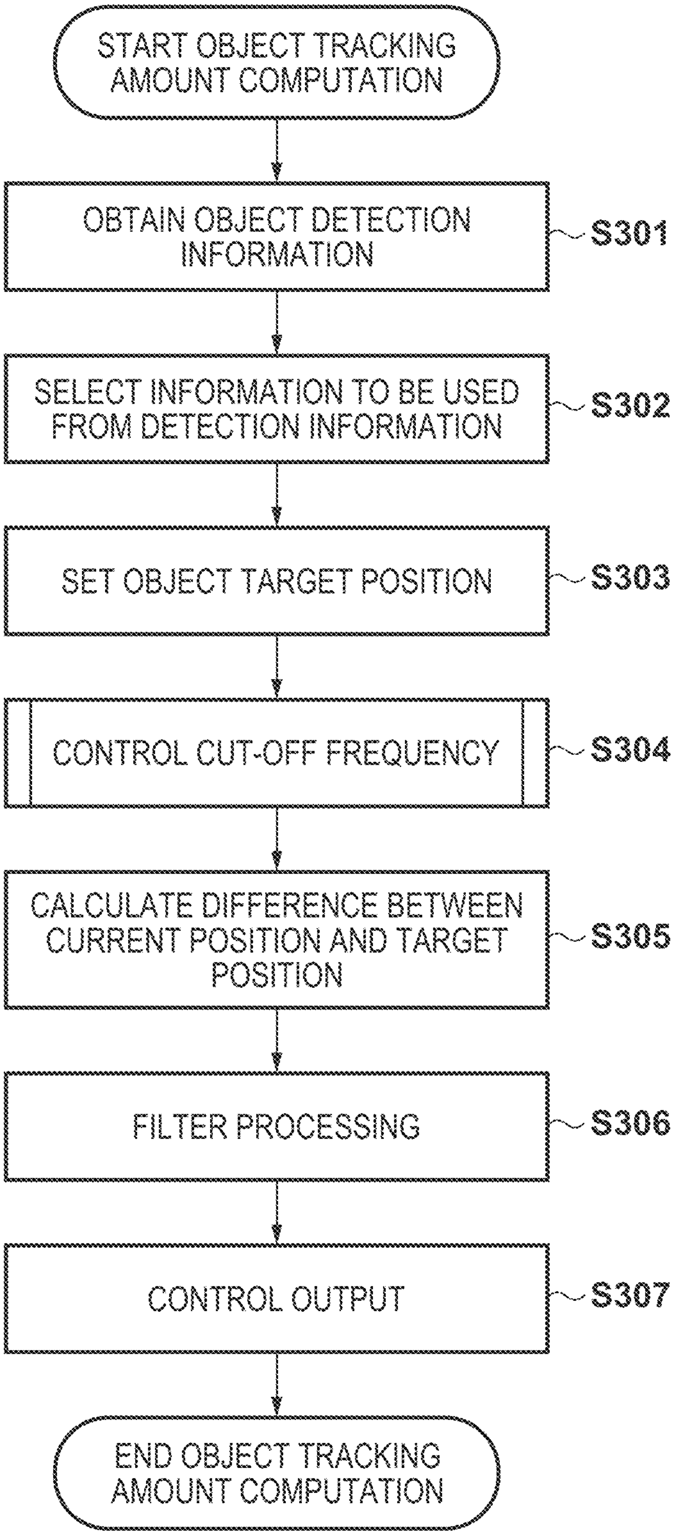
FIG. 3A is a flowchart for explaining operation for calculating an object tracking amount.
Figure 3B:
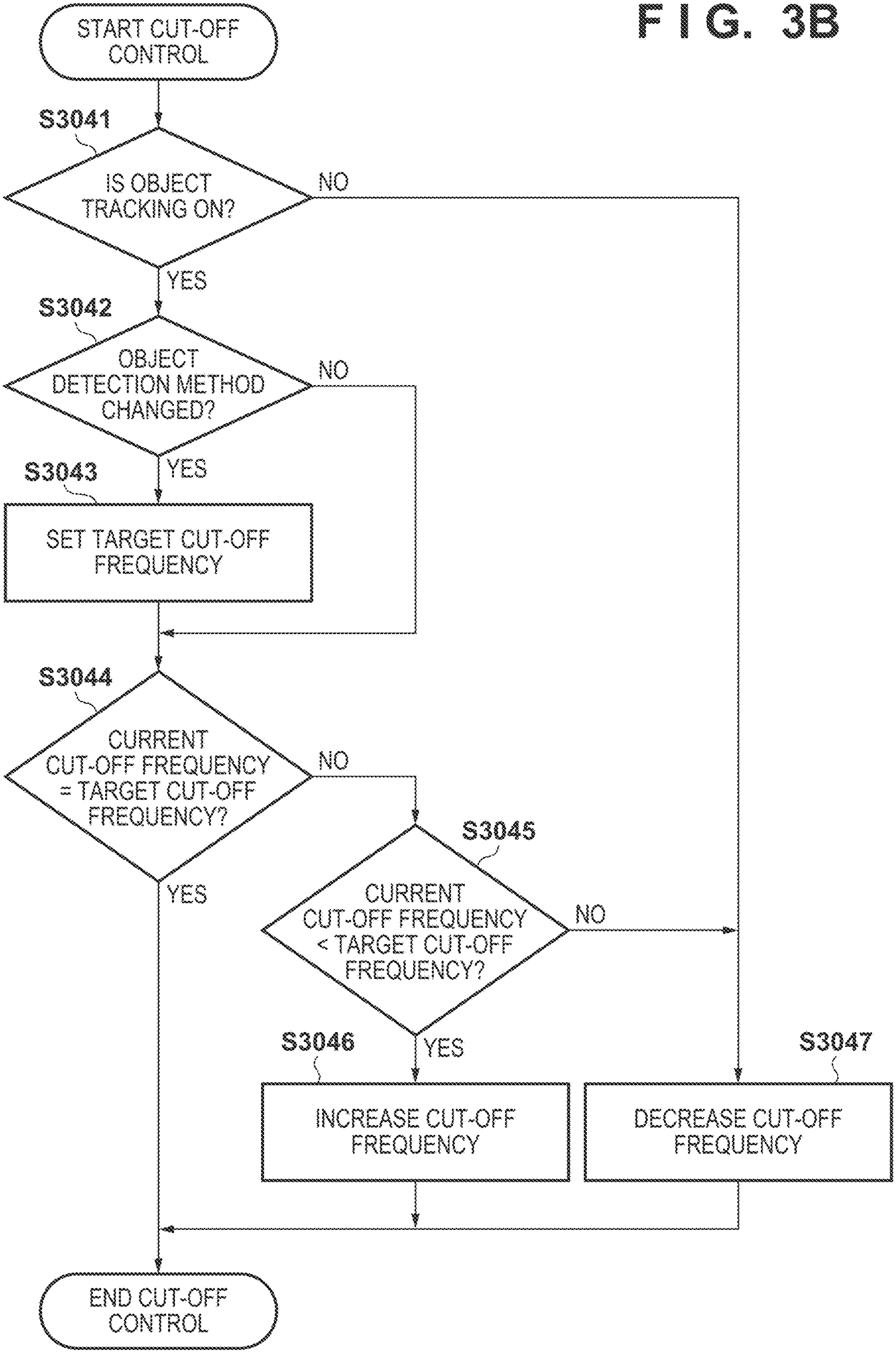
FIG. 3B is a flowchart for explaining operation for controlling a cut-off frequency.

FIGS. 3A and 3B are flowcharts for explaining operation for object tracking processing. The processing of this flowchart is generally assumed to be executed at intervals at which object detection is performed. Further the processing of this flowchart is realized by the camera control unit 115 executing a control program stored in the internal memory 110. In FIG. 1, each block illustrated in the camera control unit 115 is generally realized by the camera control unit 115 executing a control program stored in the internal memory 110. Therefore, in the following description, each block in the camera control unit 115 may be represented as a performer of operation.

First, in step S301, the camera control unit 115 performs processing for obtaining object detection information. As described above, the object detection unit 1091 detects an image region of an object included in a captured image based on an image signal outputted from the imaging element 106 and generates object detection information. The object detection information includes information such as a type of an object (person, animal, vehicle, etc.), a detected part (pupil, face, body, etc.), and a position and a size of each organ or part.

In step S302, the camera control unit 115 performs processing for selecting information to be used for object tracking processing from the information obtained in step S301. The object position obtaining unit 1411 obtains an object position from the object detection information and the object detection method obtaining unit 1412 obtains a method by which the selected object position was calculated from the object detection information. When object detection is executed using a plurality of detection methods, an object position and an object position calculation method are selected in step S302, but the processing of step S302 varies depending on how object detection is executed. For example, it is conceivable that in a case where object detection is executed using one detection method but an object cannot be detected using that detection method (reliability of the detection result is low), a method in which object detection is started using another detection method, and if an object is detected, object detection in which yet another detection method is used is not performed. With such a method, in step S301, a detection method by which an object was detected and an object position detected by that detection method are obtained as the object detection information, and thus, there is no need to select information to be used for object tracking processing in step S302.

In step S303, the camera control unit 115 sets an object target position. The object target position is set in advance by the photographer through the operation unit 114. Unless it is set again by the photographer, the object target position need not be updated every time.

In step S304, the camera control unit 115 performs processing for controlling the cut-off frequency of a low-pass filter (LPF) related to object tracking amount calculation in accordance with the object detection method and on/off of the object tracking function. The low-pass filter (LPF) performs processing for extracting a low-frequency component of information related to the position of an object. Here, control of the cut-off frequency will be described with reference to FIG. 3B.

FIG. 3B is a flowchart for explaining operation of cut-off frequency control processing according to the present embodiment.

First, in step S3041, the camera control unit 115 determines whether the object tracking function is on or off. The camera control unit 115 advances the processing to step S3042 if the object tracking function is on (step S3041: Yes), and advances the processing to step S3047 if the object tracking function is off (step S3041: No).

In step S3042, the camera control unit 115 determines whether there has been a change of the object detection method. This can be determined by comparing the object detection method obtained in step S302 in FIG. 3A with the previous object detection method. The camera control unit 115 advances the processing to step S3043 if the object detection method has changed (step S3042: Yes), and advances the processing to step S3044 if the object detection method has not changed (step S3042: No).

In step S3043, the camera control unit 115 sets a target cut-off frequency that accords with the object detection method. The target cut-off frequency is the largest cut-off frequency in the low-pass filter (LPF computation) pertaining to object tracking amount computation determined for a respective object detection method.

As described above, the purpose of the low-pass filter (LPF) processing according to object tracking amount computation is to remove noise from the object detection position. In particular, if noise that is larger than a predetermined frequency is included in the object position, the imaging range of a moving image is changed by the object tracking processing, thereby leading to shaking of the moving image. This will be described with reference to FIGS. 4A and 4B.

Figure 4A:
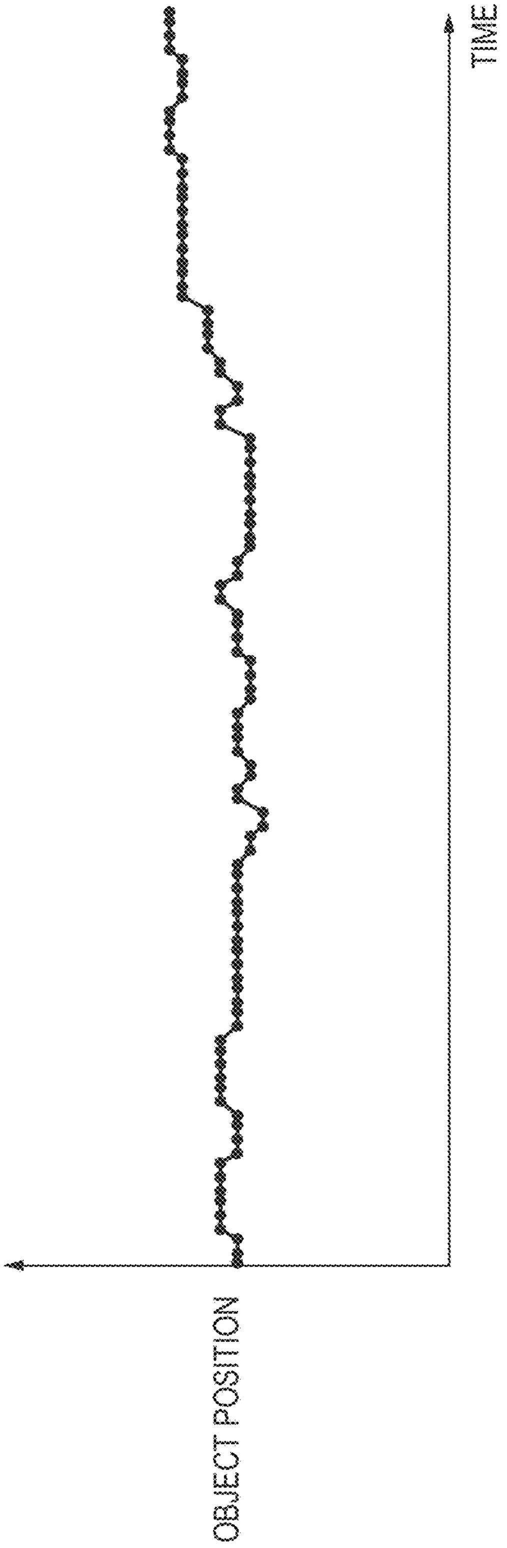
FIGS. 4A and 4B are diagrams illustrating a time-series position of an object based on a difference between object detection methods.
Figure 4B:
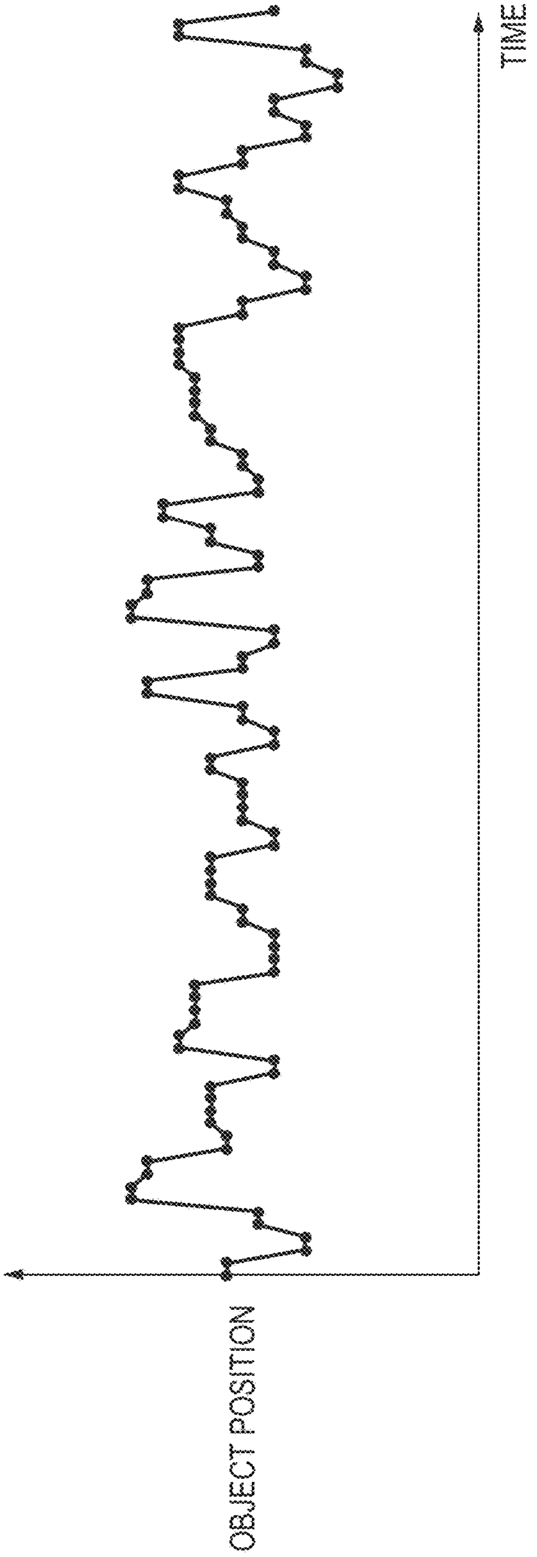

FIGS. 4A and 4B illustrate examples of a change in position data according to the object detection method. FIG. 4A is object position data for when calculation has been performed by face detection processing. FIG. 4B is object position data for when calculation has been performed not by face detection processing but by object identification processing.

From FIGS. 4A and 4B, it can be seen that there is a difference in a degree of variation in the object position, that is, in the amount of noise, depending on the object detection method. When object tracking is performed using a signal obtained by subjecting object position data of FIG. 4B to low-pass filter (LPF) processing with a high cut-off frequency, a moving image will end up with constant shaking.

Therefore, it is preferable to cut the noise component so as to prevent constant shaking. However, when an LPF is used to reduce noise in the object position, as the cut-off frequency is lowered, instances in which the movements of the object cannot be tracked increases. This is because the above LPF acts not only on the noise component but also on the motion component of the object, thereby lowering the degree of tracking. Therefore, it is desirable that the cut-off frequency of the low-pass filter (LPF) be tuned by balancing the effects of object trackability and noise.

From the above, it is desirable that the target cut-off frequency be determined in advance in accordance with the object detection method. It is considered that the target cut-off frequency may be high if the object position variation is relatively small as in FIG. 4A but it is desired that the target cut-off frequency be set to be low if the object position variation is relatively large as in FIG. 4B.

Here, regarding the object detection method, the amount of noise included in the object position may be different between a human and an animal, even if the method is the same, such as face detection. This is considered to be due to a difference in feature data used in pattern matching processing performed at the time of object detection. Similarly, in detection in which deep learning is used, there may be a difference in the amount of noise included in the object position due to a difference in the learning model. Therefore, it is desirable that the target cut-off frequency be provided taking feature data and a reference model used for object detection processing into consideration.

In view of the above, the target cut-off frequency is determined taking noise included in object position data and object trackability for each object detection method into consideration. By doing so, a degree of tracking and cutting off of the noise component can both be achieved in accordance with the object detection method.

When the processing of step S3043 is completed, the camera control unit 115 advances the processing to step S3044.

In step S3044, the camera control unit 115 determines whether the current cut-off frequency is equal to the target cut-off frequency. The camera control unit 115 terminates the cut-off frequency control processing if the current cut-off frequency is equal to the target cut-off frequency (step S3044: Yes), and advances the processing to step S3045 if the current cut-off frequency is not equal to the target cut-off frequency (step S3044: No).

In step S3045, the camera control unit 115 determines whether the current cut-off frequency is smaller than the target cut-off frequency. The camera control unit 115 advances the processing to step S3046 if the current cut-off frequency is smaller than the target cut-off frequency (step S3045: Yes), and adds a predetermined amount to the current cut-off frequency. The predetermined amount to be added is controlled such that the cut-off frequency changes gradually by predetermined small amounts being added, rather than the cut-off frequency are increased to the target cut-off frequency at once. When the processing of step S3046 is completed, the cut-off frequency control processing is terminated.

Meanwhile, if the current cut-off frequency is greater than the target cut-off frequency (step S3045: No), the camera control unit 115 advances the processing to step S3047 and subtracts a predetermined amount from the current cut-off frequency. The predetermined amount to be subtracted is controlled such that the cut-off frequency changes gradually by predetermined small amounts being subtracted, rather than the cut-off frequency are reduced to the target cut-off frequency at once.

If object tracking is off in step S3041 (step S3041: No), in step S3047 the camera control unit 115 performs processing for lowering the cut-off frequency. As the cut-off frequency decreases, the degree of object tracking gradually decreases and object tracking becomes disabled. When the processing of step S3047 is completed, the camera control unit 115 terminates the cut-off frequency control processing.

This concludes the description of the flow related to the cut-off frequency control processing of FIG. 3B.

Returning to the description of FIG. 3A, after the cut-off frequency has been controlled in step S304, the camera control unit 115 advances the processing to step S305.

In step S305, the camera control unit 115 calculates a difference between the current object position and the object target position. The current object position has already been obtained in step S302, and the object target position has already been obtained in step S303.

In step S306, the camera control unit 115 performs filter (LPF) calculation processing on the computation result calculated in step S305 by using the cut-off frequency determined in step S304.

In step S307, the camera control unit 115, for example, adjusts a resolution and performs limit processing, for input into a projective transformation circuit thereafter. By applying output of step S307 to the projective transformation circuit, it is possible to keep the object positioned around the center (object target position) of the screen.

This concludes the description of the object tracking processing of FIG. 3.

Next, a relationship between the object detection method, the cut-off frequency, and the degree of tracking will be described with reference to FIGS. 5 and 6.

Figures 5, 6:
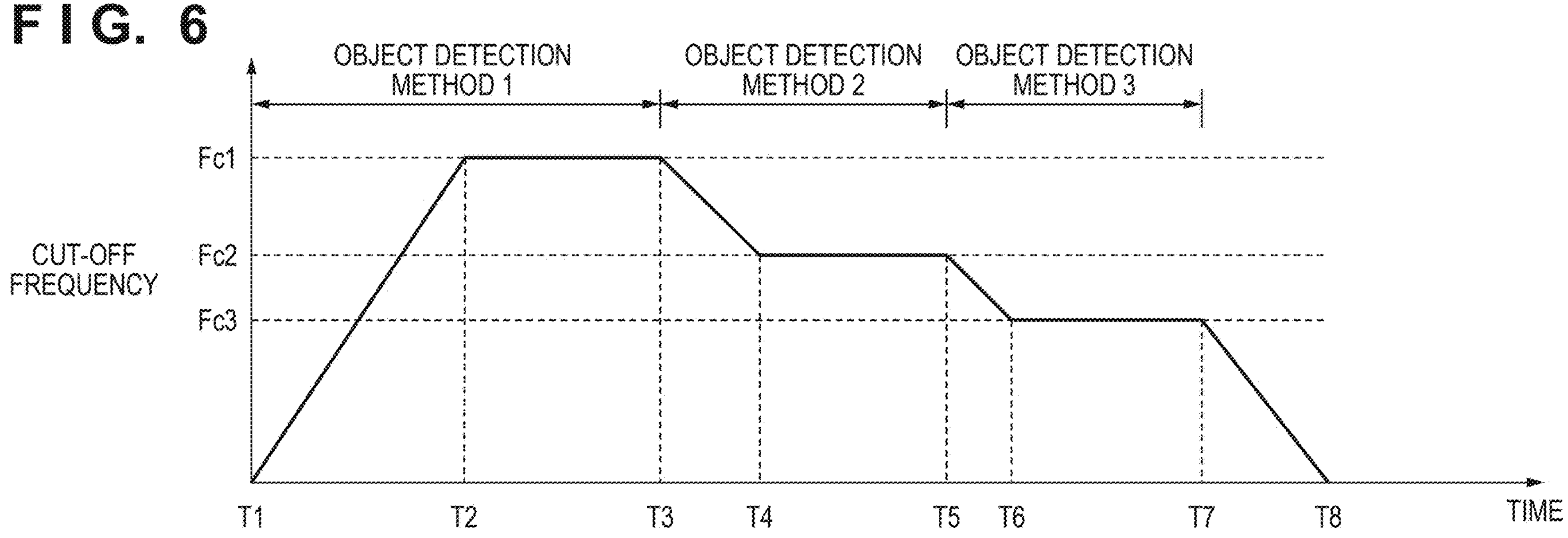
FIG. 5 is a diagram illustrating a relationship between an object detection method, a cut-off frequency, and a degree of tracking.
FIG. 6 is a diagram illustrating a change in cut-off frequency for when the object detection method changes.

FIG. 5 is a diagram illustrating the object detection method, the cut-off frequency, and the degree of tracking. Here, regarding the amount of noise included in the object position, it is assumed that a relationship is object detection method 1<object detection method 2<object detection method 3.

When a target cut-off frequency for object detection method 1 is Fc1, a target cut-off frequency for object detection method 2 is Fc2, and a target cut-off frequency for object detection method 3 is Fc3, a relationship among Fc1, Fc2, and Fc3 can be determined to be Fc1>Fc2>Fc3 from the above noise amount relationship.

FIG. 6 is a time-series graph illustrating a change in the cut-off frequency for when the object detection method changes from object detection method 1 to object detection method 2 and from object detection method 2 to object detection method 3 during object tracking and then tracking is terminated.

Time T1 is a timing at which a tracking start operation is performed. At that time, it is assumed that an object is being detected using object detection method 1, and in a period from time T1 to time T2, the cut-off frequency is gradually increased to Fc1. The degree of tracking increases as the cut-off frequency increases.

At time T2, the target cut-off frequency Fc1 is reached, and thus, the cut-off frequency is maintained at the target cut-off frequency Fc1. In a period from time T2 to time T3, the degree of tracking is maintained to be "high" (see FIG. 5).

At time T3, a change from object detection method 1 to object detection method 2 is made. Since the target cut-off frequency is changed from Fc1 to Fc2 according to the change of the object detection method, the cut-off frequency is gradually lowered from the present frequency to Fc2 in a period from time T3 to time T4. The degree of tracking decreases as the cut-off frequency decreases.

At time T4, the target cut-off frequency Fc2 is reached, and thus, the cut-off frequency is maintained at the target cut-off frequency Fc2. In a period from time T4 to time T5, the degree of tracking is maintained to be "medium" (see FIG. 5).

At time T5, a change from object detection method 2 to object detection method 3 is made. Since the target cut-off frequency is changed from Fc2 to Fc3 according to the change of the object detection method, the cut-off frequency is gradually lowered from the present frequency to Fc3 in a period from time T5 to time T6. The degree of tracking decreases as the cut-off frequency decreases.

At time T6, the target cut-off frequency Fc3 is reached, and thus, the cut-off frequency is maintained at the target cut-off frequency Fc3. In a period from time T6 to time T7, the degree of tracking is maintained to be "low" (see FIG. 5).

Time T7 is a timing at which an object tracking end operation is performed. When terminating object tracking, the tracking component is made to approach 0 by the cut-off frequency being gradually decreased.

This concludes the description of a relationship between the object detection method, the cut-off frequency, and the degree of tracking with reference to FIGS. 5 and 6. A rate of change in the cut-off frequency (amount of change per unit time) may vary depending on the situation. For example, the rate of change may be different between increase and decrease of the cut-off frequency. Further, the rate of change may vary depending on a magnitude of a necessary amount of change in the cut-off frequency.

As described above, according to the present embodiment, by changing the degree (extent) of tracking in accordance with the object detection method, it is possible to reduce a change in the object tracking amount according to the object detection method, and as a result, it is possible to reduce a change in the imaging range.

Second Embodiment

In the present embodiment, a method in which a change in an imaging range for when an object tracking method is changed during object tracking is reduced by adjusting an object position according to an object detection method will be described.

When the object tracking method is changed during object tracking, if the object detection position of the object detection unit 1091 is used as is, the object position may change in a stepped manner. Furthermore, the object position changing in a stepped manner affects the object tracking amount, and as a result, the imaging range changes drastically, and the moving image ends up being visually unappealing. This is thought to be due to a change in the size of a region recognized to be the object when the object detection method changes.

Therefore, when the object detection method changes, it is desirable that a change in the object tracking amount be reduced by the object position being adjusted accordingly.

Hereinafter, the imaging apparatus according to a second embodiment will be described. The configuration of the imaging apparatus is similar to that in FIGS. 1 and 2 of the first embodiment. In the present embodiment, in order to simplify the description, the object target position is set to the center of the screen.

Figure 7A:
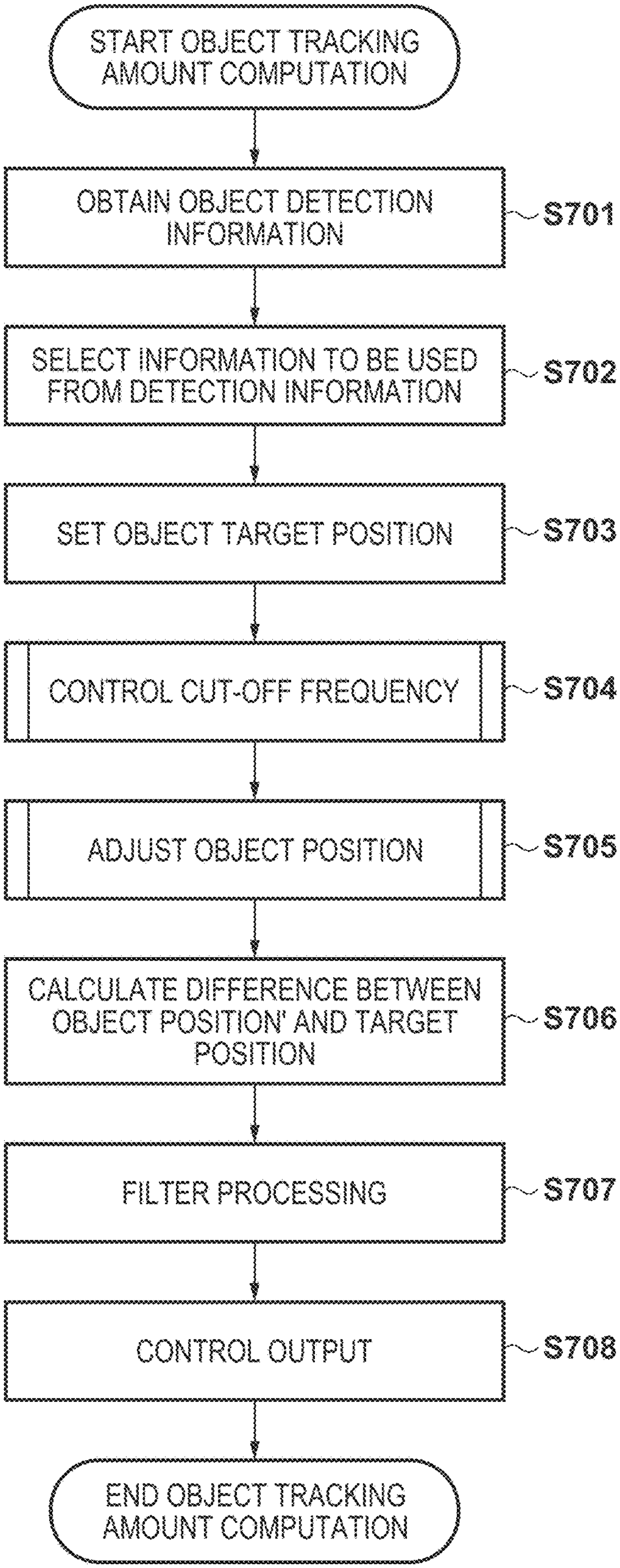
FIG. 7A is a flowchart for explaining an operation of calculating an object tracking amount according to a second embodiment.
Figure 7B:
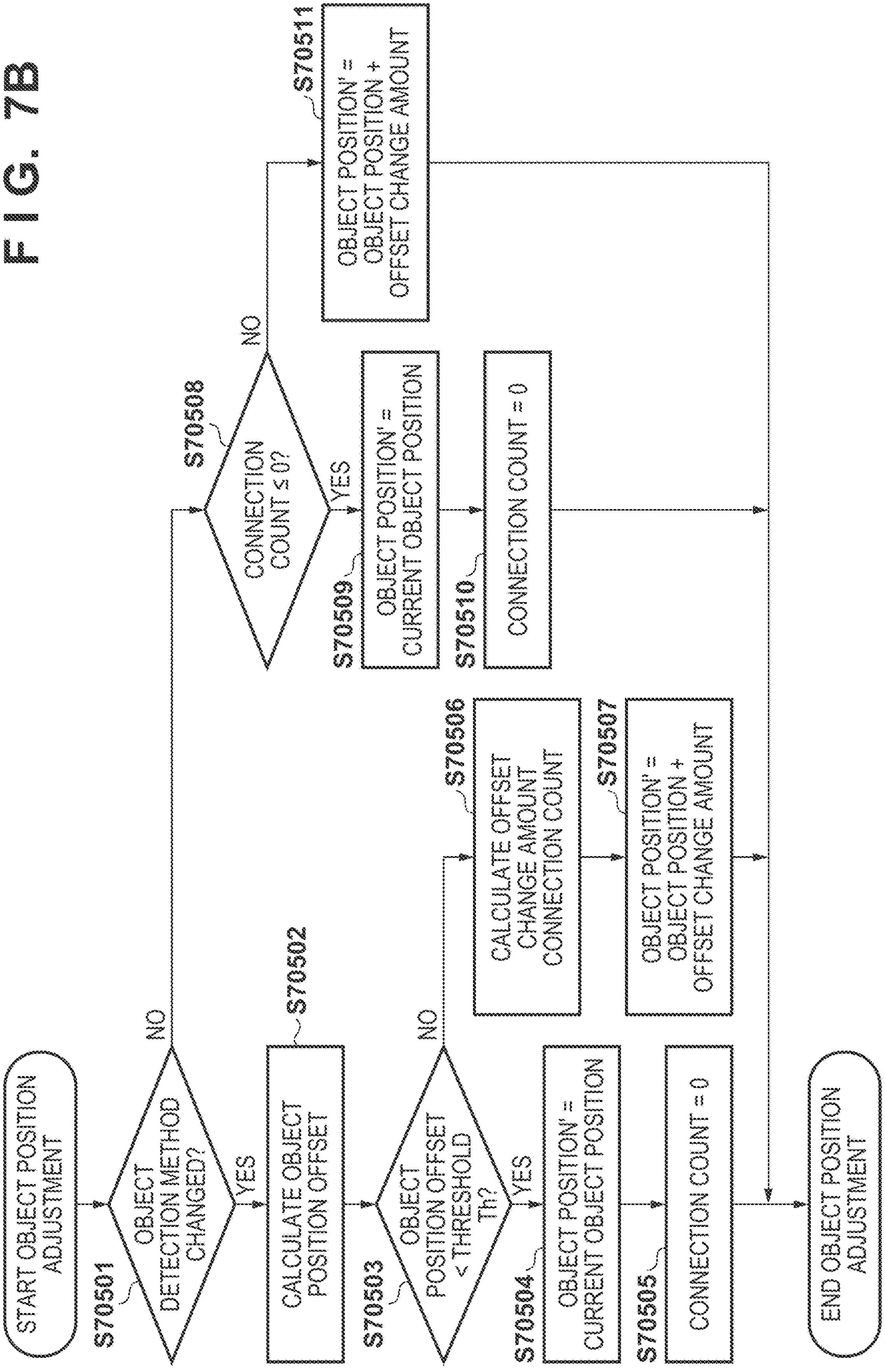
FIG. 7B is a flowchart for explaining an operation of adjusting an object position.

FIGS. 7A and 7B are flowcharts for explaining operation for object tracking processing according to the second embodiment. Further the processing of this flowchart is realized by the camera control unit 115 executing a control program stored in the internal memory 110. In FIG. 1, each block illustrated in the camera control unit 115 is generally realized by the camera control unit 115 executing a control program stored in the internal memory 110. Therefore, in the following description, each block in the camera control unit 115 may be represented as a performer of operation.

In FIG. 7A, steps S701 to S704 are similar to steps S301 to S304 of FIG. 3A in the first embodiment, and thus, description will be omitted.

In step S705, the camera control unit 115 adjusts an object position. The object position adjustment unit 1422 illustrated in FIG. 2 performs processing for adjusting an object position as necessary based on information on an object position and information on an object detection method from the object information obtaining unit 141. The adjustment of the object position by the object position adjustment unit 1422 will be described below with reference to a flowchart of FIG. 7B.

In step S70501, the camera control unit 115 determines whether there has been a change of the object detection method. This can be determined by comparing the object detection method obtained in step S302 in FIG. 3A with the previous object detection method. The camera control unit 115 advances the processing to step S70502 if the object detection method has changed (step S70501: Yes), and advances the processing to step S70508 if the object detection method has not changed (step S70501: No).

In step S70502, the camera control unit 115 obtains an offset of the object position. The offset of the object position is a difference between the previous object position, that is, the object position in the past object detection method, and the current object position, that is, the object position with the object detection method after the change. When the processing of step S70502 is completed, the camera control unit 115 advances the processing to step S70503.

In step S70503, the camera control unit 115 determines whether the offset of the object position calculated in step S70502 is smaller than a predetermined threshold Th. The camera control unit 115 advances the processing to step S70504 if the offset amount of the object position is smaller than the predetermined threshold (step S70503: Yes).

In step S70504, the camera control unit 115 substitutes an object position' with the object position after the change of the object detection method as is, assuming that a change in the object position due to a change in the object detection method is negligibly small. When the processing of step S70504 is completed, the camera control unit 115 advances the processing to step S70505.

In step S70505, the camera control unit 115 sets a count number (hereinafter, referred to as connection count) for smoothly connecting object positions, which is set when the offset amount of the object position is larger than the predetermined threshold, to 0. In step S70504, the object positions do not need to be smoothly connected, and thus, the connection count may be set to 0. When the processing of step S70505 is completed, the camera control unit 115 terminates adjustment of the object position.

Meanwhile, if the offset amount of the object position is greater than or equal to the predetermined threshold Th in step S70503 (step S70503: No), the camera control unit 115 advances the processing to step S70506.

In step S70506, in order to adjust a change in the object position due to a change of the object detection method, the camera control unit 115 determines the count number (connection count) necessary for connection processing and an offset change amount for each connection count based on the offset amount of the object position. When the processing of step S70506 is completed, the camera control unit 115 advances the processing to step S70507.

In step S70507, the camera control unit 115 substitutes the object position' with a value obtained by adding the offset change amount to the object position after the change of the object detection method. When the processing of step S70507 is completed, the camera control unit 115 terminates adjustment of the object position.

Step S70508 is determination processing to which the processing proceeds when the object detection method has not changed. In step S70508, the camera control unit 115 determines whether the connection count is 0 or less. The camera control unit 115 advances the processing to step S70509 if the connection count is 0 or less (step S70508: Yes).

In step S70509, the camera control unit 115 directly substitutes the object position' with the current object position and advances the processing to step S70510. In step S70510, the camera control unit 115 sets the connection count to 0 and terminates adjustment of the object position.

Meanwhile, if the connection count is greater than 0 in step S70508 (step S70508: No), the camera control unit 115 advances the processing to step S70511.

In step S70511, the camera control unit 115 substitutes the object position' with a value obtained by adding the offset control amount to the current object position. Here, since the period is that for connecting object positions after the object detection method has changed in a loop before the flowchart, computation for gradually connecting to the object position after the change of the object detection method is performed. When the processing of step S70511 is completed, the camera control unit 115 terminates adjustment of the object position.

This concludes the description of FIG. 7B.

Returning to the description of FIG. 7A, after adjusting the object position in step S705, the camera control unit 115 advances the processing to step S706. In step S706, the camera control unit 115 calculates a difference between the object position' after the adjustment and the object target position. When the processing of step S706 is completed, the camera control unit 115 advances the processing to step S707.

Steps S707 and S708 are similar to steps S306 and S307 of FIG. 3A in the first embodiment, and thus, description will be omitted.

This concludes the description related to FIGS. 7A and 7B.

Figure 8A:
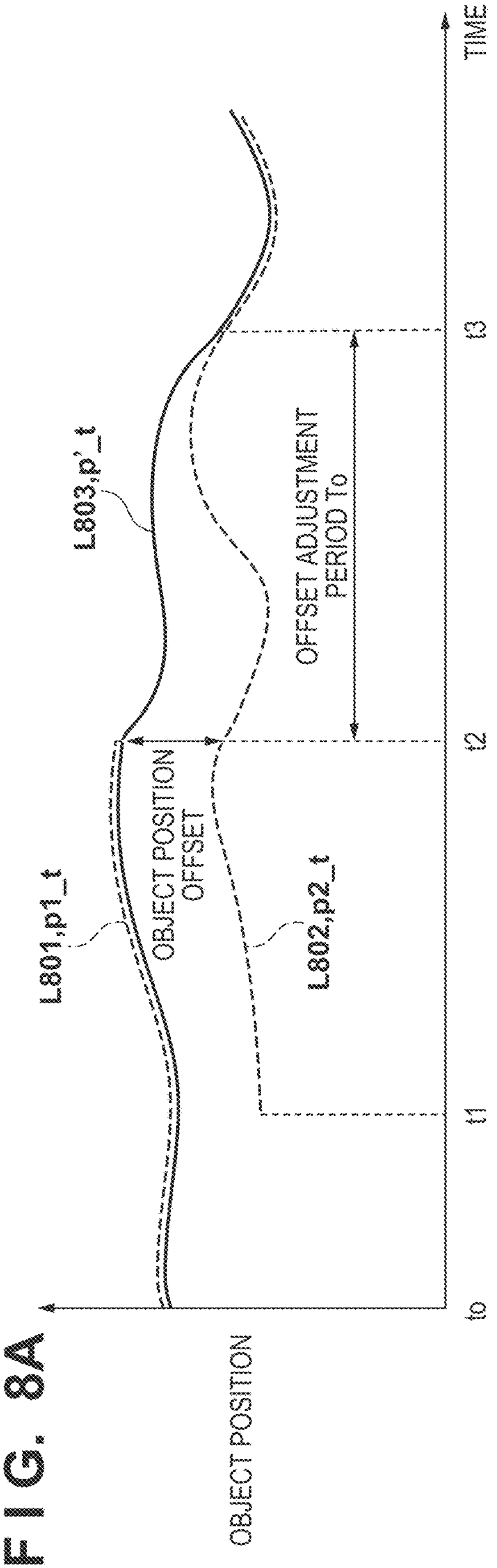
FIGS. 8A and 8B are diagrams illustrating a time-series position of an object based on a difference in the object detection method.
Figure 8B:
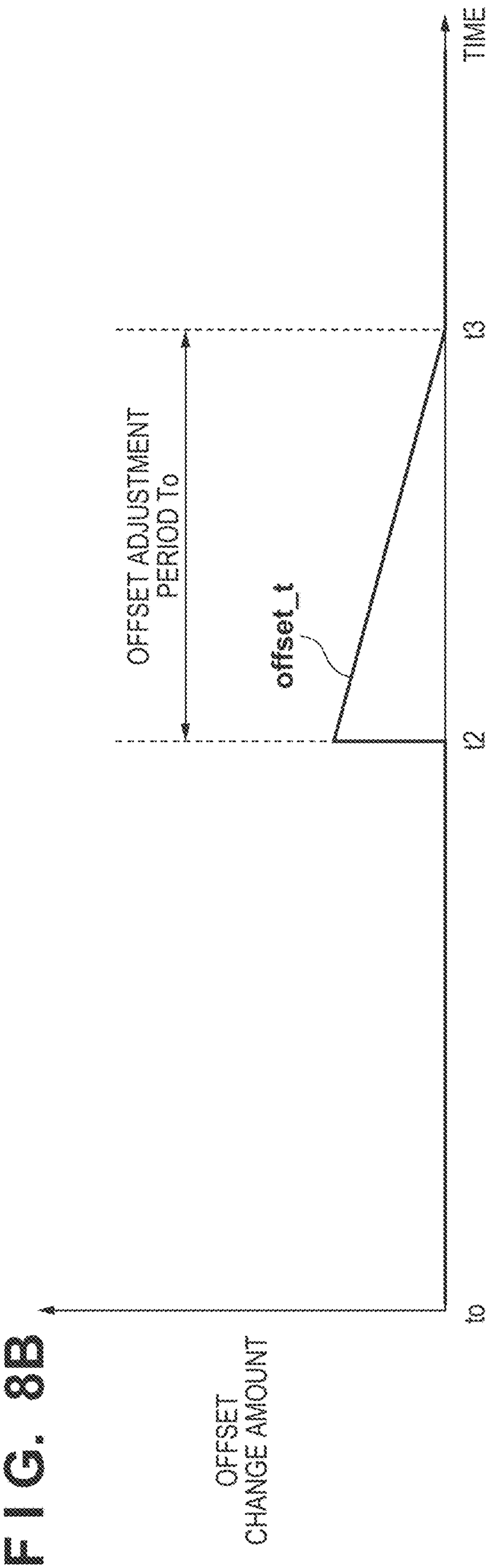

FIGS. 8A and 8B are graphs representing an object position in time series.

In FIG. 8A, it is assumed that a dashed line L801 indicates an object position in object detection method 1 and is expressed as p1(t) using time t. Similarly, it is assumed that a dashed line L802 indicates an object position in object detection method 2 and is expressed as p2(t) using time t.

The object position in the object detection method 1 is calculated from time t0 and becomes incalculable at a timing of time t2. Meanwhile, it is assumed that the object position in object detection method 2 is calculated starting from time t1, and is continuously calculated thereafter. Regarding a reason why the object position cannot be calculated, various reasons, such as a case where there is an accumulated blur in the captured image and an object cannot be recognized or a case where an object cannot be recognized due to the movement of the object, can be considered.

Time t2 is a timing at which the object detection method has changed. As illustrated in FIG. 8A, there are cases where a plurality of object detection methods are at work at the same time and calculating respective object positions.

In the present embodiment, it is assumed that the amount of noise included in the object position data is smaller for object detection method 1 than object detection method 2, and so long as the object position is being calculated using object detection method 1, that position data is used. This is because, as described in the first embodiment, the smaller the noise amount, the greater the degree of tracking can be made to be.

However, when the object position is switched from that obtained using object detection method 1 to that obtained using object detection method 2, according to a switch of the object detection method at time t2, a difference between a position p1(t2) and a position p2(t2) will occur instantaneously. Due to this difference, the object tracking amount changes drastically and results in shaking of the imaging range (captured image). This difference is illustrated as an object position offset of FIG. 8A.

Therefore, in the present embodiment, a switch of the object detection method is detected, and the object position is adjusted at that timing. The object position after adjustment is expressed by a solid line L803 of FIG. 8A as the object position'. In addition, assuming that it is expressed as p'(t), using time t, the method of calculating p'(t) is as follows.

First, from time to t0 time t2, p'(t)=p1(t).

Then, from time t2 to time t3, p'(t)=p2(t)+offset(t). Here, offset(t) is the offset change amount. The offset change amount will be described with reference to FIG. 8B.

The offset change amount is a value determined based on the object position offset, whose absolute value monotonically decreases, and serves to smoothly connect the object position difference between different object detection methods. Here, the offset change amount is set to be a linear change but is not limited thereto, and the absolute value of offset(t) need only monotonically decrease. The offset change amount may change in polarity depending on the object detection method before and after transition and may thus assume a negative value.

A period from time t2 to time t3 is an offset adjustment period To, and the object position obtained by object detection method 1 and the object position obtained by object detection method 2 are connected over this period. The longer the offset adjustment period To, the smoother the object position can be connected. However, in cases where the object detection method is frequently switched or depending on tracking processing intervals, the degree of tracking may decrease. Therefore, the offset adjustment period To may be changed according to the frame rate or the scene.

A configuration may be taken so as to determine the above connection count according to the offset adjustment period To or set a predetermined connection count in advance and determine the offset adjustment period To based on the object position offset and the connection count.

Returning to the description of FIG. 8A, finally, at time t3 onward, p'(t)=p2(t).

By adjusting the object position' according to the object detection method as described above, it is possible to reduce a change in the imaging range (captured image) for when the object tracking method has changed during object tracking.

In terms of smoothly connecting object positions and reducing a change in the object tracking amount, the use of filter (LPF) processing is also conceivable; however, since this may be disadvantageous in terms of tracking delay, it is considered that in many cases it is better to adjust the object position as in the present embodiment. However, the use of a method of adjusting the object position according to the present embodiment and the filter (LPF) processing may be switched therebetween according to the imaging condition.

In the present embodiment, the object position adjustment unit 1422 in the object tracking amount computation unit 142 adjusts the object position according to the object detection method, but similar processing may be performed in the image processing circuit 109 or the object detection unit 1091.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-020598, filed Feb. 14, 2024, which is hereby incorporated by reference herein in its entirety.

What is claimed is:

1. An object tracking apparatus comprising:

at least one processor or circuit and a memory storing instructions to cause the at least one processor or circuit to perform operations of the following units:

(1) an object detection unit configured to be capable of detecting an object in a captured image by using a plurality of detection methods;

(2) a tracking unit configured to change an imaging range based on a difference between a position of the object detected by the object detection unit and a target position within a captured image, and to track the object; and (3) a control unit configured to control a degree of tracking at which the tracking unit changes the imaging range based on the difference, in accordance with a detection method used for obtaining the position of the object.

2. The object tracking apparatus according to claim 1, wherein the at least one processor or circuit is configured to further function as a setting unit configured to set the target position.

3. The object tracking apparatus according to claim 1, wherein the control unit includes a low-pass filter for extracting a low-frequency component of information related to a position of the object in order to adjust the degree of tracking, and changes a cut-off frequency of the low-pass filter in accordance with an accuracy of the detection method.

4. The object tracking apparatus according to claim 3, wherein the higher the accuracy of the detection method, the higher the cut-off frequency of the low-pass filter is set to be by the control unit.

5. The object tracking apparatus according to claim 3, wherein the control unit sets a target cut-off frequency of the low-pass filter in accordance with the detection method, and gradually brings the cut-off frequency of the low-pass filter closer to the target cut-off frequency by using a predetermined amount of change.

6. The object tracking apparatus according to claim 1, wherein the tracking unit adjusts a position of the object in accordance with the detection method, and calculates an amount of adjustment of the imaging range based on the adjusted position of the object.

7. The object tracking apparatus according to claim 6, wherein the tracking unit adjusts the position of the object in accordance with an amount of change in the position of the object at a timing at which the detection method has switched.

8. The object tracking apparatus according to claim 1, wherein the plurality of detection methods include any of (1) a method for detecting a particular object in the captured image and (2) a method for identifying an object by comparison of images among a plurality of frames.

9. The object tracking apparatus according to claim 1, wherein the plurality of detection methods include any of template matching, deep learning, and pattern matching.

10. The object tracking apparatus according to claim 1, wherein the tracking unit changes the imaging range by cutting out an image from the captured image.

11. The object tracking apparatus according to claim 1, wherein the tracking unit changes the imaging range by moving a lens.

12. The object tracking apparatus according to claim 1, wherein the tracking unit changes the imaging range by moving an imaging element.

13. The object tracking apparatus according to claim 1, wherein the tracking unit changes the imaging range by panning/tilting an imaging apparatus.

14. An object tracking method comprising:

executing object detection allowing detection of an object in a captured image by using a plurality of detection methods;

changing an imaging range based on a difference between a position of the object detected in the object detection and a target position within a captured image, and tracking the object; and controlling a degree of tracking at which the changing changes the imaging range based on the difference, in accordance with a detection method used for obtaining the position of the object.

15. A non-transitory computer-readable storage medium storing a program for causing a computer to execute an object tracking method, the method comprising:

executing object detection allowing detection of an object in a captured image by using a plurality of detection methods;

changing an imaging range based on a difference between a position of the object detected in the object detection and a target position within a captured image, and tracking the object; and controlling a degree of tracking at which the changing changes the imaging range based on the difference, in accordance with a detection method used for obtaining the position of the object.

* * * * *